United States Patent
Bedingfield et al.

(10) Patent No.: US 6,714,639 B1
(45) Date of Patent: Mar. 30, 2004

(54) SYSTEM AND METHOD FOR PROVIDING CALLING NAME SERVICES WITH LOCAL NUMBER PORTABILITY

(75) Inventors: J. Carl Bedingfield, Lilburn, GA (US); Neil Gilmartin, Atlanta, GA (US); George H. Grier, Kennesaw, GA (US); Charles L. Heiker, Decatur, GA (US); David A. Scott, Norcross, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 606 days.

(21) Appl. No.: 09/610,319

(22) Filed: Jul. 5, 2000

(51) Int. Cl.[7] ............................. H04M 7/00; H04M 1/56
(52) U.S. Cl. .............................. 379/221.13; 379/142.01
(58) Field of Search ........................ 379/221.01, 221.08, 379/221.09, 221.1, 221.11, 229, 230, 219, 221.12, 221.13, 142.01, 142.1

(56) References Cited

U.S. PATENT DOCUMENTS 5,854,836 A * 12/1998 Nimmagadda ......... 379/221.13
5,949,865 A * 9/1999 Fusinato ................ 379/221.09
6,028,921 A * 2/2000 Malik et al. ........... 379/201.04

OTHER PUBLICATIONS

GR–1299–CORE: Switch–Service Control Point (SCP)/Adjunct Interface Generic Requirements, Issue 3, Jul. 1996.
Lata/Switching Systems Generic Requirements, "Class Features: Calling Name Delivery Requirements," FSD01–02–2070 TR–NTW–001188, Issue 1, Dec. 1991.

* cited by examiner

Primary Examiner—Benny Tieu
(74) Attorney, Agent, or Firm—Shaw Pittman LLP

(57) ABSTRACT

LNP databases are made locally accessible to one or more CNAM SCP to avoid network traffic associated with LNP routing determinations required with the advent of providers local number portability. All CNAM service queries are routed to the one or more CNAM SCPs for processing. Service routing is determined from the local accessible LNP databases without additional network traffic associated with such routing determinations in conventional systems. Four classes of service provider are defined. Queries for telephone services are routed in accordance with the class of service provider.

26 Claims, 9 Drawing Sheets

SYSTEM AND METHOD FOR PROVIDING CALLING NAME SERVICES WITH LOCAL NUMBER PORTABILITY

BACKGROUND

1. Field of Invention

The present invention relates generally to the field of telecommunications. More specifically, the present invention relates to the field of providing telephone services to telephone subscribers in the context of local number portability.

2. Background of the Invention

Historically, the telephone service infrastructure has been based on the concept that groups of telephone numbers are assigned to a particular switch. These assignments provided predictability in determining where a telephone number was homed, and where information relating to that telephone number could be obtained. Under this system, if a telephone subscriber changed his or her telephone service, requiring a telephone number in an area served by another switch, that telephone subscriber would be issued a new telephone number, which would be homed on the switch servicing the subscriber's new area. Such changes could occur for a number of reasons including, for example, the telephone subscriber moving from one telephone company to another telephone company. As can be imagined, changing a telephone subscriber's telephone number caused the telephone subscriber significant inconvenience including, for example, the burden of informing others of the telephone number change.

To avoid this inconvenience, local number portability (LNP) was instituted. LNP is described in Telcordia standard GR-1299-CORE: *Switch-Service Control Point (SCP)/Adjunct Interface Generic Requirements,* Issue 3, July 1996, which is hereby incorporated by reference herein in its entirety. Briefly, with LNP, a telephone subscriber can keep his or her telephone number despite making changes in telephone service that require his or her telephone number to be homed on a different switch. Moving a telephone number from one switch to another is referred to as porting the telephone number. By allowing telephone numbers to port, however, LNP destroys the original assignment of telephone numbers to particular switches. Consequently, LNP removes the predictability of telephone number-switch assignments that facilitates routing of telephone numbers, and identifying where information about the telephone numbers is located.

To overcome this problem, LNP standard 1299 provides Global Title Translation (GTT) routing. In LNP routing, an LNP routing record is created for each ported telephone number. An LNP routing record includes the telephone number's call routing and any service routings associated with the telephone number. FIG. 1 illustrates an exemplary LNP routing record 101. LNP routing record 101 contains a telephone number 102 and a local routing number (LRN) 104 corresponding to telephone number 102. LRN 104 is the network address of the switch on which telephone number 102 is homed.

The LNP routing record also contains GTT routings corresponding to certain additional services associated with the telephone number. Such services include Customized Local Area Signaling Services (CLASS), caller ID name identification (CNAM), Inter-Switch Voice Messaging (ISVM) and Line Information Database (LIDB). Each service routing record contains a destination point code (DPC) and a subsystem number (SSN). The DPC is an address of a server on the telephone signaling network that provides the particular service. The subsystem number identifies the particular application executed by the server to implement the service being provided. Exemplary service routings are illustrated as service routings 1–4 in FIG. 1. Using the DPC and SSN, a service request can be issued over the telephone network to provide the service.

When a telephone number is ported, each telephone company having an interest in the porting is advised of the change. FIG. 2 is a schematic illustration of a conventional system 201 for updating LNP databases to reflect a particular telephone number porting. A first telephone company 202 notifies number portability administration center (NPAC) 204 that a telephone number, TN, is porting to it by sending NPAC 204 a notification message 203 advising NPAC 204 of TN's porting. Service message 203 provides NPAC 204 with a telephone number record 208. Telephone number record 208 is an LNP routing record for telephone number TN. Telephone number record 208 also contains four form fields called capability codes.

When NPAC 204 receives LNP routing record 208, it broadcasts LNP routing record 208 to all telephone companies in the region, for example, telephone companies 206a and 206b. Telephone companies 206a and 206b use the information contained in LNP routing record 208 to update their respective LNP databases.

For example, with respect to a telephone company 206b, NPAC 204 broadcasts service message 203 through LNP gateway 209 to a service management system (SMS) 210. SMS 210 obtains telephone record 208 from service message 203, and stores it in an SMS database 216. From the information contained in the LNP routing record 208, a network element record 218 is created. Network element record 218 is a record containing routing information for the telephone number including a local routing number and service routing (destination point code and subsystem number). In this example, SMS 210 then accesses database 216 to transmit network record element 218 to service control points (SCPs) 212a and 212b. SCPs 212a and 212b store network element record 218 in their respective LNP databases 214a and 214b.

Services, for example calling name identification (CNAM) service, associated with particular telephone numbers can also be affected by LNP. FIG. 3 illustrates a schematic diagram of a system 301 for providing CNAM service conventionally in the LNP environment. Referring to FIG. 3, when a calling party 302 calls a called party 304, switch 306, on which calling party 302's telephone number is homed, communicates with switch 308, on which called party 304's telephone number is homed, across SS7 network 310 to establish the telephone call. Switch 308 is owned by telephone company 330. Telephone company 330 provides CNAM processing for telephone numbers homed on switch 308. Switch 308 determines that called party 304 subscribes to the caller name identification (CNAM) service. The CNAM service is described in Telcordia standard *Lata Switching System is Generic Requirements, "Class Features: Calling Name Delivery Requirements,"* FSD01-02-1070, TR-NTW-001188, Issue 1, December, 1991, which is hereby incorporated by reference herein in its entirety. There are four types of CNAM service depending on where calling party 302's telephone number is homed and industry agreements.

A first case of CNAM service is for telephone numbers of subscribers of a telephone company that manages its own CNAM databases, for example, telephone company 330. For these subscribers, telephone company 330's CNAM databases 316a–d contain the telephone number and directory name corresponding to each telephone number for its subscribers.

A second case of CNAM service is for telephone numbers of subscribers whose telephone numbers are homed on a switch owned by another telephone company that does not maintain its own CNAM databases, for example telephone company 332. Generally, telephone company 332 enters into an agreement for telephone company 330 to provide CNAM service for its subscribers. In this case, telephone company 330's CNAM databases contain the telephone numbers and corresponding directory names for telephone company 332's subscribers. For the second type of CNAM service, telephone company 332 issues the CNAM query, as described above with respect to the first case of telephone numbers to telephone company 330's CNAM service.

A third case of CNAM service is for the telephone numbers of subscribers whose telephone numbers are homed on the switch of another telephone company that maintains its own CNAM database, for example telephone company 334. In this case, telephone company 334 enters into an agreement with telephone company 330 to provide CNAM processing for telephone company 334's subscribers. For the third case of CNAM service, LNP SCP 320 directs the CNAM query to telephone company 334 for processing.

A fourth case of CNAM service is for the telephone numbers of subscribers whose telephone numbers are homed on the switch of a telephone company, for example telephone company 336, for which there is no agreement in place regarding the handling of CNAM service. For the fourth case of CNAM service, telephone company 330 returns a default message in response to the CNAM query. For example, telephone company 330 can return city and state information regarding the calling party number in response to the CNAM query.

In conventional systems, STP 314 routes the CNAM query for processing on the basis of the 6-digit NPA-NXX. As is well-known, the NPA-NXX corresponds to the first six digits of a ten-digit telephone number that can be used for routing purposes. If the NPA-NXX corresponds to a telephone number served by the first or second case of CNAM service, STP 314 directs the CNAM query to CNAM SCP 312a–d. CNAM SCP 312a–d are connected to CNAM databases 316a–d respectively. CNAM databases 316a–d store telephone numbers and their corresponding directory names. When CNAM SCP 312a–d receives the query, it performs a database lookup of CNAM databases 316a–d, using the calling party telephone number as an index, to obtain the calling party name (i.e., directory name) associated with calling party 302's telephone number. A message containing the calling party name and telephone number is sent to switch 308. Switch 308 transfers the information to a caller ID display device 318 on which calling party 302's telephone number and calling party 302's name are displayed to called party 304.

If the NPA-NXX corresponds to a telephone number served by the third case of CNAM service, STP 314 routes the CNAM query to telephone company 334 for processing. Calling party 302's directory name is returned to switch 308, and is ultimately displayed along with calling party 302's telephone number on called party 304's caller ID display device 318.

If the NPA-NXX corresponds to a telephone number served by the fourth type of CNAM service, STP 314 routes the CNAM query to CNAM SCP 312a–d which returns a default message to switch 308 in response to the CNAM query. For example, CNAM SCP 312a–d can return city and state information regarding the calling party number to switch 308 in response to the CNAM query.

A number of problems arise in the conventional system for processing CNAM queries in the LNP environment. For example, when a telephone number is ported out of the first or second cases of CNAM service, the telephone company must diligently remove that telephone number's information from its databases. If it does not, the telephone company may deliver incorrect CNAM information in response to a CNAM query for that telephone number.

Another problem is CNAM query loops. A CNAM query loop can occur when a telephone number served by the third type of CNAM service is ported to a home switch where it is served by the first or second type of CNAM service, for example a telephone number ported from telephone company 334 to telephone company 330. In this case, STP 314 sends a CNAM query to the telephone company 334 for processing based on the 6-digit NPA-NXX. Telephone company 334 looks in its databases and determines that the subscriber is no longer in its databases. Because it cannot process the CNAM query, telephone company 334 sends the CNAM query back to STP 314 for processing. Upon receipt of the CNAM query, STP 314 processes it by sending it back to the telephone company 334. This results in a CNAM query loop. Manual action may be required by an operator to stop the CNAM query loop.

In a conventional LNP processing system operating at BellSouth Corporation of Atlanta, Ga. (the "BellSouth system"), a calling party initiates a phone call to a called party subscribing to the CNAM service. When the switch on which the called party telephone number is homed receives the calling party's attempt to make a call to the called party, it issues a CNAM query to a signaling transfer point (STP) to obtain CNAM information corresponding to the calling party. The STP forwards the query to an LNP services control point (SCP) to obtain routing information to handle the CNAM query. The CNAM query is then routed according to the routing information. Generally, the CNAM query is routed to a CNAM SCP. Using the calling party's telephone number (contained in the CNAM query) as an index into CNAM databases containing telephone numbers and their corresponding directory names, the CNAM SCP obtains the CNAM information required to respond to the request. The response to the CNAM query (directory name and telephone number) is displayed to the called party on a caller ID display device.

In the conventional BellSouth system, STP 314 is modified to send all CNAM queries to LNP SCP 320. This modification can be accomplished by changing the routing tables in STP 314 to send all CNAM queries to LNP SCP 320. In this manner, LNP SCP 320 can access LNP databases 322a–c to determine where the information for answering the CNAM query is located for a particular telephone number. Importantly, under GTT routing, LNP SCP 320 accesses LNP databases 322a–c using the full 10-digit telephone number. This provides the most accurate service routing information available for a particular phone number.

In operation, STP 314 sends the CNAM query to LNP SCP 320. LNP SCP 320 performs a database lookup in databases 322a–c to obtain the LNP routing record corresponding to the telephone number in the CNAM query (calling party 302's telephone number). Once the LNP routing record is obtained, SCP 320 extracts the DPC and SSN corresponding to the CNAM query. This DPC provides the address of the network element that responds to CNAM queries for the telephone number contained in the CNAM query.

If the information to respond to the CNAM query can be found in a CNAM database owned by telephone company 330, for example, in CNAM databases 316a–d, (i.e., the calling party telephone number is served by the first case or second case of CNAM service). The query is then routed to CNAM SCP 312a–d. CNAM SCP 312a–d accesses the appropriate CNAM database 316a–d, using the telephone number contained in the CNAM query as an index, to obtain the directory name associated with the telephone number in the CNAM query. The directory name and calling party telephone number are returned to switch 308. Switch 308 causes the directory and name and telephone number to be displayed on calling name display device 318.

If the telephone number in the CNAM query is served by the third case of CNAM service, STP 314 redirects the CNAM query to the network node identified by the DPC and subsystem number for processing. The response to the CNAM query is sent back to switch 308 for ultimate display on CNAM data display device 318. If the telephone number in the CNAM query is determined to be of the fourth case, STP 314 routes the query to a CNAM SCP, which returns city and state data to switch 308 in response to the CNAM query.

FIG. 4A is a flow chart 401 for displaying telephone number and directory name information in a conventional LNP routing system such as the BellSouth system described above. In step 402, STP 314 receives a CNAM query. In step 404, STP 314 routes the CNAM query to LNP SCP 320. To perform step 404, the routing tables in STP 314 are modified to route CNAM queries (except those that telephone company 330 cannot process based on the NPA-NXX) to LNP SCP 320. Using the telephone number in the CNAM query as an index, LNP SCP 320 obtains the LNP routing record corresponding to the telephone number in step 406. LNP SCP 320 obtains service routing information for the CNAM service from the LNP routing record in step 408. In step 410, LNP SCP 320 routes the CNAM query to the network element identified by the DPC in the CNAM service routing of the LNP routing record for processing. In step 412, the telephone number and directory name corresponding thereto returned in response to the CNAM query, or city and state information, are displayed to called party 304 on called ID display device 318.

Referring to FIG. 4B, routing step 410 is described in more detail. In step 420, LNP SCP 320 performs a database lookup in databases 322a–c to obtain the LNP routing record corresponding to the telephone number, TN, in the CNAM query. In step 422, LNP SCP 320 determines if the telephone number is served by the first, second or fourth case of CNAM service. If the telephone call is served by the first, second or fourth case of CNAM service, LNP SCP 320 routes the call to CNAM SCP 312 in step 424. In step 426, CNAM SCP 312a–d determines whether the telephone number corresponds to the fourth case of numbers. If it does, CNAM SCP 312a–d returns city and state information to switch 308 in step 434. The city and state information is then displayed on display device 318 in step 435. If the telephone number does not correspond to the fourth case, then in step 426, CNAM SCP 312a–d performs a database lookup in CNAM databases 316a–d to obtain the directory name corresponding to the telephone number in the CNAM query. If no record is found, as determined by step 428, CNAM SCP 312 returns city and state information to switch 308 in step 434. The city and state information is displayed on caller ID display device 318 in step 435. If a record is found, as determined in step 428, CNAM SCP 312 returns telephone number and directory name information to switch 308. The telephone number and directory information is displayed on caller ID device 318 in step 432.

If, in step 436, LNP SCP 320 determines the telephone number in the CNAM query is served by the third case of CNAM service, then, in step 438, it routes the CNAM query to the network element identified in the LNP routing record for processing. That network element returns the telephone number and directory name information to switch 308 for ultimate display on caller ID display device 318. In step 435 the city and state information is displayed on caller ID display device 318.

It can be seen then that while the advent of LNP provides convenience for telephone subscribers, there is a significant increase in network traffic due to sending the CNAM query to LNP SCP 320 to perform an LNP database lookup to acquire the address of the network server that should process CNAM query. With the increasing popularity of the calling party name service, this additional network traffic could deteriorate the operation of the telephone network, and even cause it to fail.

SUMMARY OF THE INVENTION

The present invention solves the foregoing problems in the art by duplicating much of the information in LNP databases in new LNP databases that are made accessible to CNAM SCPs. In addition, the STP is reconfigured to send all CNAM queries to the CNAM SCP rather than the LNP SCP as in conventional systems. Because the CNAM SCPs have access to the information in the LNP databases, no network messaging is required to obtain the routing information necessary to satisfy the requested service, in the preferred embodiment, the CNAM service. Rather, the necessary routing information is obtained from the new LNP databases accessed by the CNAM SCP. In practice, the majority of the CNAM queries are handled by the CNAM SCP, that is, of the first, second or fourth classes of service. Thus, network traffic is limited to the relatively few telephone numbers falling in the third class.

The STP routes the CNAM query to the CNAM SCP. The CNAM SCP first determines the appropriate network element to handle the CNAM query. In most cases that network element will be the CNAM SCP. Consequently, there will be no need to send the CNAM query elsewhere for handling. As a result, network traffic is significantly reduced over a conventional system such as the BellSouth system described above, which must transmit the CNAM query to an LNP SCP and then to a CNAM SCP for processing.

Thus, one object of the present invention is to conserve network resources.

Another object of the present invention is to reduce routing related traffic on the SS7 network.

Yet another object of the present invention is to make LNP routing information available to the CNAM SCP most likely to be responsible for obtaining the information required to perform a particular service.

These and other objects of the present invention are described in greater detail in the detailed description of the invention, the appended drawings and the attached claims.

DETAILED DESCRIPTION OF THE PREFERRED EMBODIMENTS

Figure 5:
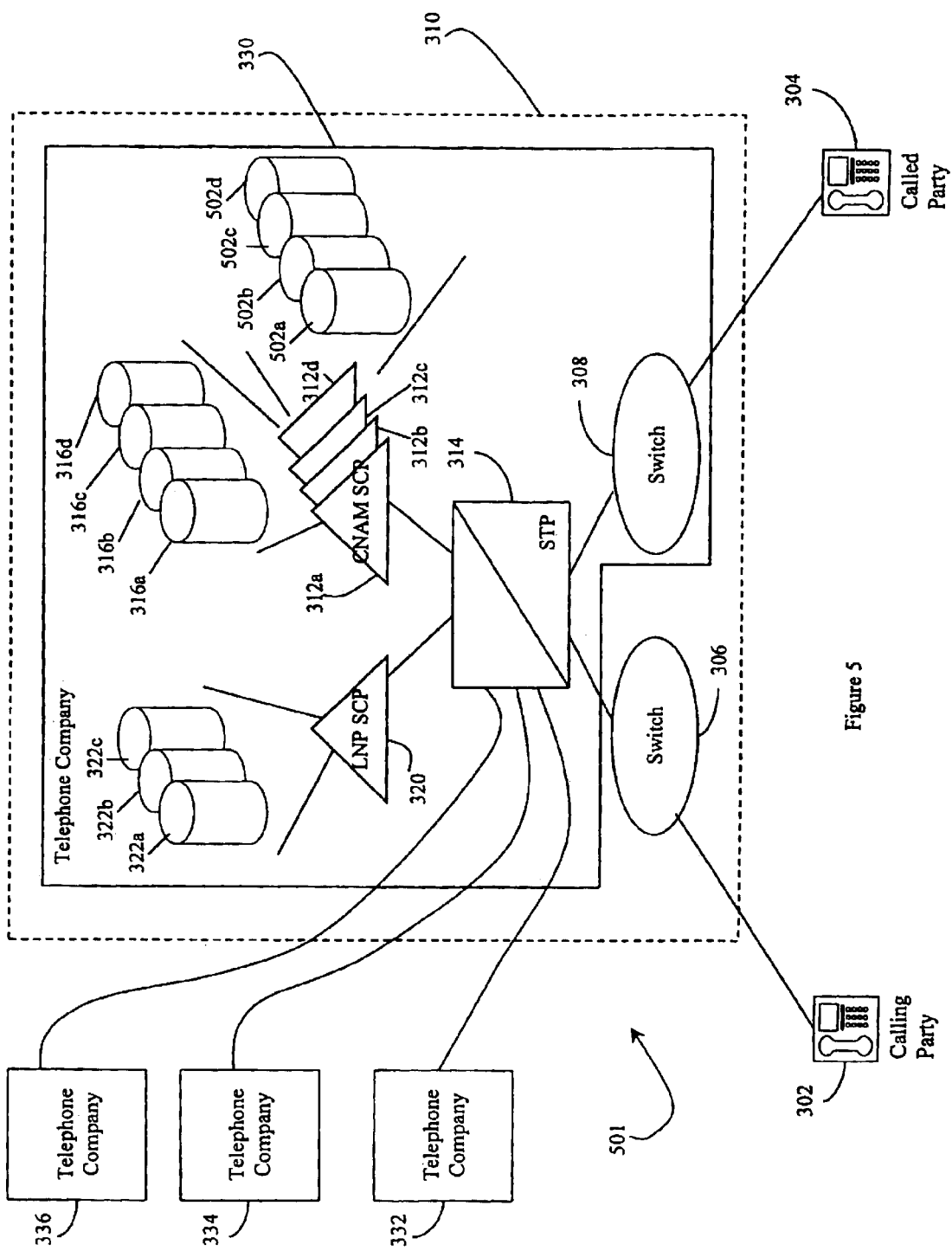
FIG. 5 is a schematic diagram of a system for providing CNAM service with LNP according to a preferred embodiment of the present invention.

A system 501 according to a preferred embodiment of the present invention that substantially reduces the network traffic problem described above with respect to conventional LNP routing systems is illustrated schematically in FIG. 5. Referring to FIG. 5, LNP databases 502a–d are added to telephone company 330's network. LNP databases 502a–d are accessed by CNAM SCP 312a–d respectively. Alternatively, LNP databases 502a–d are accessed by a separate CNAM LNP SCP co-located with the CNAM SCP. LNP databases 502a–d store the service routings to provide the CNAM service for telephone numbers in CNAM databases 316a–d. Thus, LNP databases 502a–d store the DPC and subsystem number (SSN) corresponding to the CNAM service for each ported telephone number and the DPC, SSN for default routing for each port eligible NPA-NXX in CNAM databases 316a–d. Preferably, LNP databases 502a–d contain the same information as LNP database 322a–c, but the information could be truncated to only the subset of LNP data that is relevant to CNAM. This would economize memory utilization on CNAM SCPs 312a–d.

In operation, when a calling party 302 calls called party 304, switch 308 determines that called party 304 has calling name service and sends out a CNAM query to SCP 312a–d through STP 314. That is, STP 314 is modified to send all CNAM queries to CNAM SCP 312a–d. This modification can be accomplished by changing the routing tables in STP 314 to send all CNAM queries to CNAM SCP 312a–d. This routing modification would be well-known to those skilled in the art given the disclosure provided herein.

CNAM SCP 312a–d then queries LNP databases 502a–d to determine whether calling party 302's telephone number has ported anywhere. Thus, CNAM SCP 312 indexes LNP databases 502a–d using the calling party's telephone number included in the CNAM query to determine the correct network element to handle the CNAM query.

If CNAM SCP 312a–d is the correct network element to handle the CNAM query (i.e., the telephone number is served by the first, second or fourth cases of CNAM service), CNAM SCP 312a–d accesses CNAM databases 316a–d to obtain the calling party name associated with the telephone number included in the CNAM query. The obtained calling party name is transmitted to switch 308, which sends it to calling party 304 for display on CNAM display device 318. If CNAM SCP 312a–d does not find a directory name associated with the telephone number, CNAM SCP 312a–d returns city and state information to switch 308.

There are several reasons why there may not be a directory name associated with the telephone number in the CNAM databases. The most common reasons are related to timing of updating databases when telephone numbers are ported. For example, the company responsible for providing directory names corresponding to telephone numbers of the second case may be delayed in delivering those directory names.

If CNAM SCP 312a–d is not the proper network element to handle the CNAM query, CNAM SCP 312a–d redirects the CNAM query to the correct network element, for example, telephone company 334, determined from the information in LNP databases 502a–d corresponding to calling party 302's telephone number. This redirection is not part of the CNAM 1188 standard. However, it is implemented in the present invention, and is described in further detail below. Experience indicates that only a small percentage of CNAM queries will require this redirection because only a small percentage of telephone numbers are of the third case.

If the telephone number is of the fourth case, CNAM SCP 312a–d returns city and state information to switch 308. Switch 308 forwards the city and state information to called party 304 for display on caller ID display device 318.

By directing all CNAM queries to CNAM SCP 312a–d, the preferred embodiment of the present invention significantly reduces the amount of network traffic required to process CNAM queries that is present in conventional systems. This is because, as described above, only a small percentage of telephone numbers are of the third case, that is, have been ported to telephone companies having agreements such as described with respect to telephone company 334. Consequently, whereas CNAM queries in conventional systems require messages sent to two SCPs over the telephone network (the first message to LNP SCP 320 to determine the appropriate routing, and the second message to CNAM SCP 312a–d to process the CNAM query), the preferred embodiment of the present invention only requires one message to be sent over the telephone network (the CNAM query to CNAM SCP 312a–d) in the vast majority of cases.

Figure 6A:
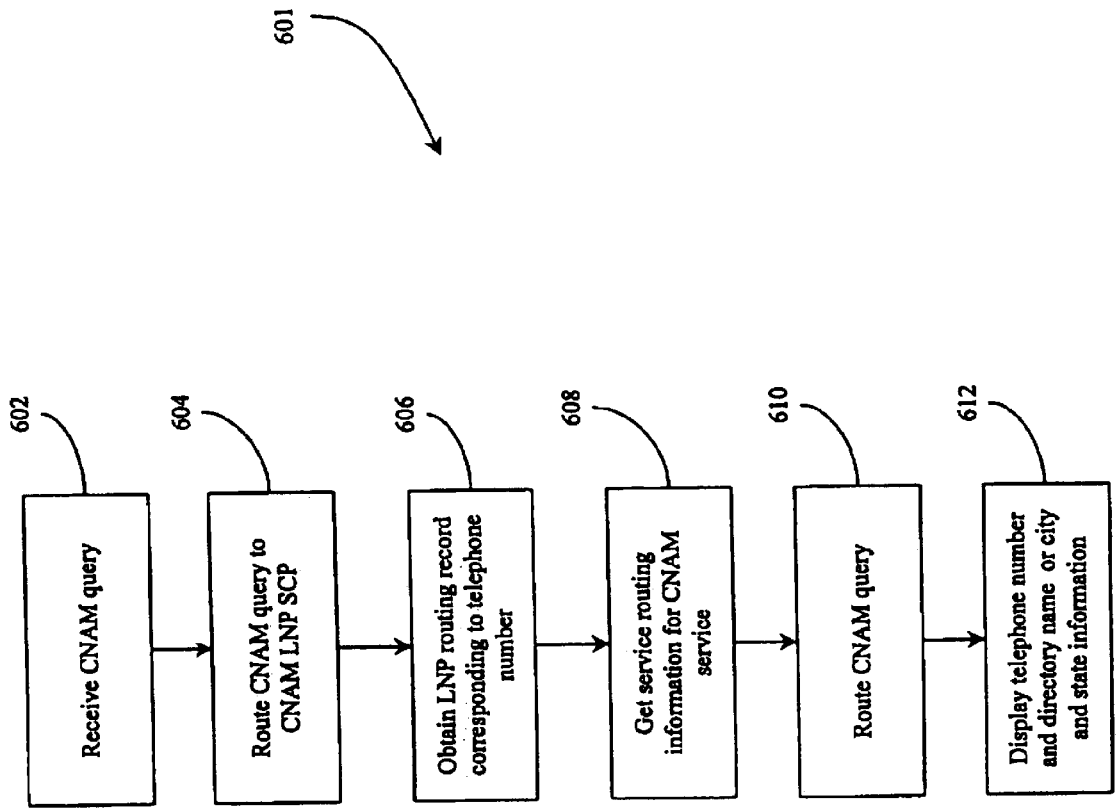
FIG. 6A is a flow chart for providing CNAM service with LNP according to a preferred embodiment of the present invention.

FIG. 6A is a flow chart 601 for displaying telephone number and directory name information according to the preferred embodiment of the present invention. In step 602, STP 314 receives a CNAM query. In step 604, STP 314 routes the CNAM query to CNAM SCP 312a–d. To perform step 604, the routing tables in STP 314 are modified to route all CNAM queries (except those that telephone company 330 cannot process based on NPA-NXX as described below) to CNAM SCP 312a–d, rather than LNP SCP 320. These routing modifications would be well-known to those skilled in the art given the disclosure provided herein. Using the telephone number in the CNAM query as an index, CNAM SCP 312a–d obtains the LNP routing record corresponding to the telephone number from CNAM LNP databases 502a–d in step 606. CNAM SCP 312a–d obtains service routing information for the CNAM service from the obtained LNP routing record in step 608. In step 610, CNAM SCP 312a–d routes the CNAM query to the network element identified in the CNAM service routing of the LNP routing record for processing. In step 612, the telephone number and directory number corresponding thereto returned in response to the CNAM query, or city and state information, are displayed to called party 304 on called ID display device 318.

Figure 6B:
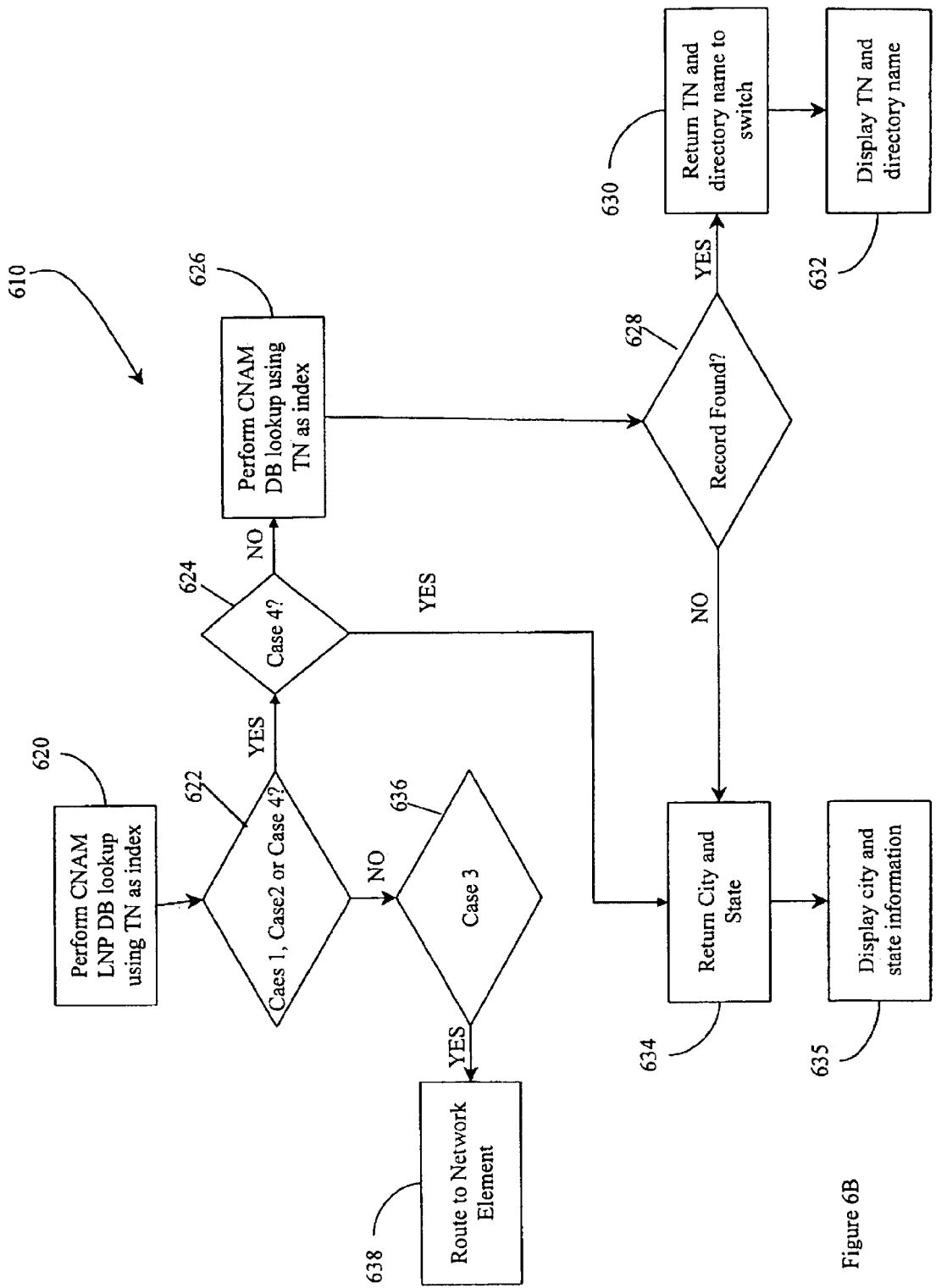
FIG. 6B is a flow chart for routing a CNAM query according to a preferred embodiment of the present invention.

Referring to FIG. 6B, routing step 610 is described in more detail. In step 620, CNAM SCP 312a–d performs a database lookup in databases 502a–d to obtain the LNP routing record corresponding to the telephone number, TN, in the CNAM query. In step 622, CNAM SCP 312a–d determines if the telephone number is served by the first, second or fourth case of CNAM service. If the telephone number is served by the first, second or fourth case of CNAM service, CNAM SCP 312a–d determines if the telephone number is served by the fourth class of service in step 624. If the telephone number is served by the fourth class of service, CNAM SCP 312a–d returns city and state information to switch 308. If the telephone number is not served by the fourth class of service, CNAM SCP 312a–d performs a database lookup in CNAM databases 316a–d to obtain the directory name corresponding to the telephone number in the CNAM query in step 626. If no record is found, as determined by step 628, CNAM SCP 312a–d returns city and state information to switch 308 in step 634. The city and state information is displayed on caller ID display device 318 in step 635. If a record is found, as determined in step 628, CNAM SCP 312a–d returns telephone number and directory name information to switch 308. The telephone number and directory information is displayed on caller ID device 318 in step 632.

If, in step 636, CNAM SCP 312a–d determines the telephone number in the CNAM query is served by the third case of CNAM service, then, in step 638, it routes the CNAM query to the network element identified in the GTT record for processing. That network element returns the telephone number and directory name information to switch 308 for ultimate display on caller ID display device 318. If the telephone call is not served by the first, second or third cases of CNAM service, CNAM SCP 312a–d returns city and state information to switch 308 in step 634. In step 635 the city and state information is displayed on caller ID display device 318.

Figure 1:
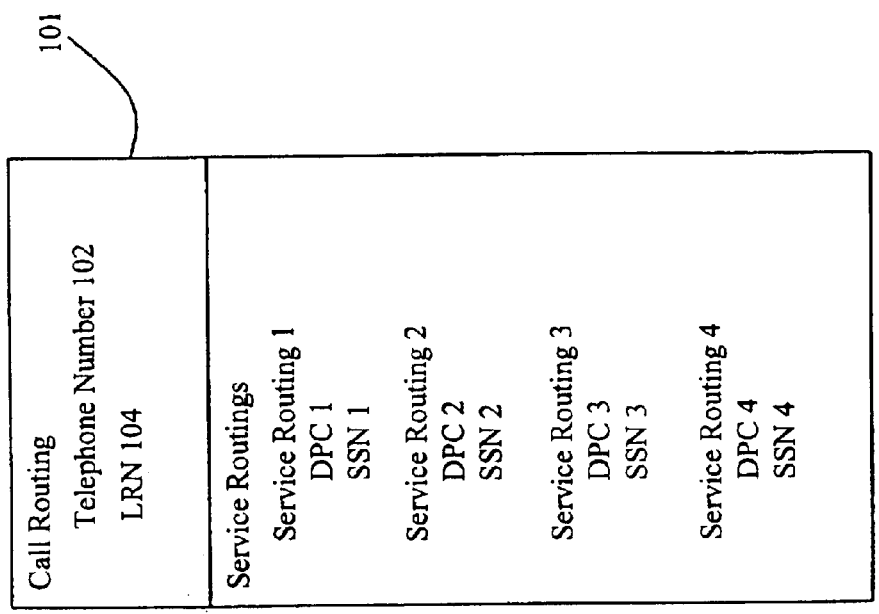
FIG. 1 is an exemplary TN routing record used in GTT routing under LNP standard 1299.
Figure 2:
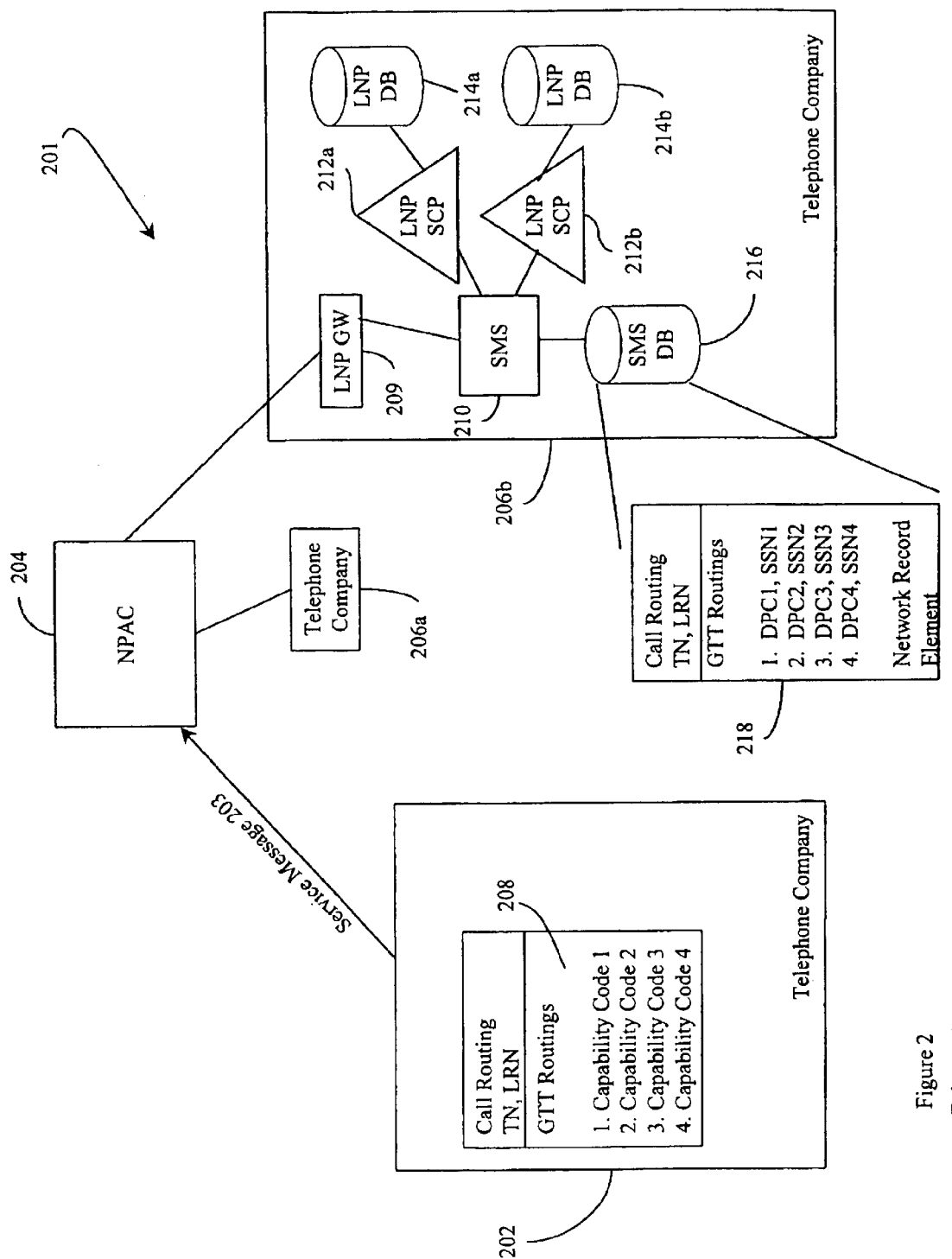
FIG. 2 is a schematic diagram of conventional system for updating a telephone company's LNP databases.
Figure 3:
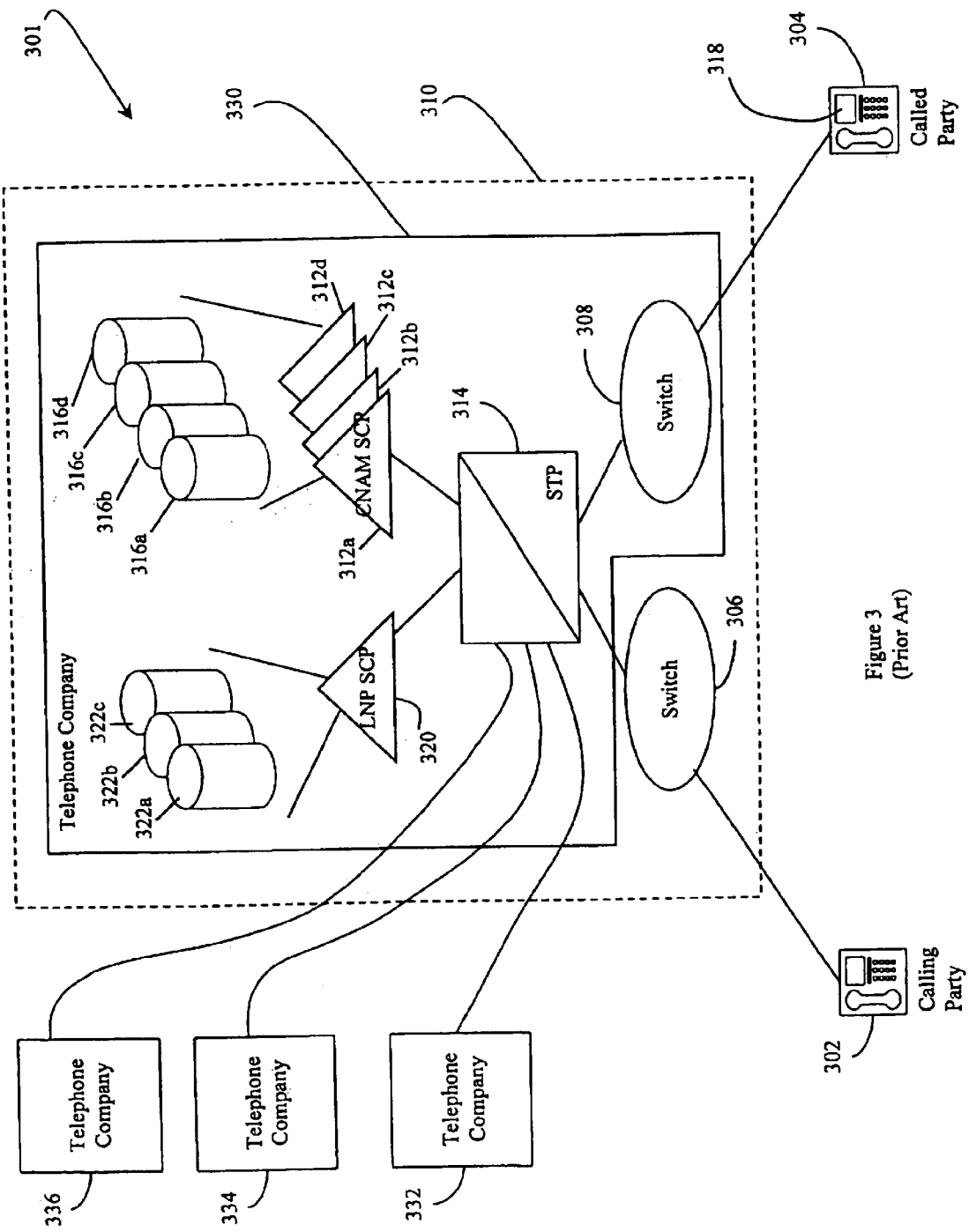
FIG. 3 is a schematic diagram of a conventional system for providing CNAM service with LNP.
Figure 4A:
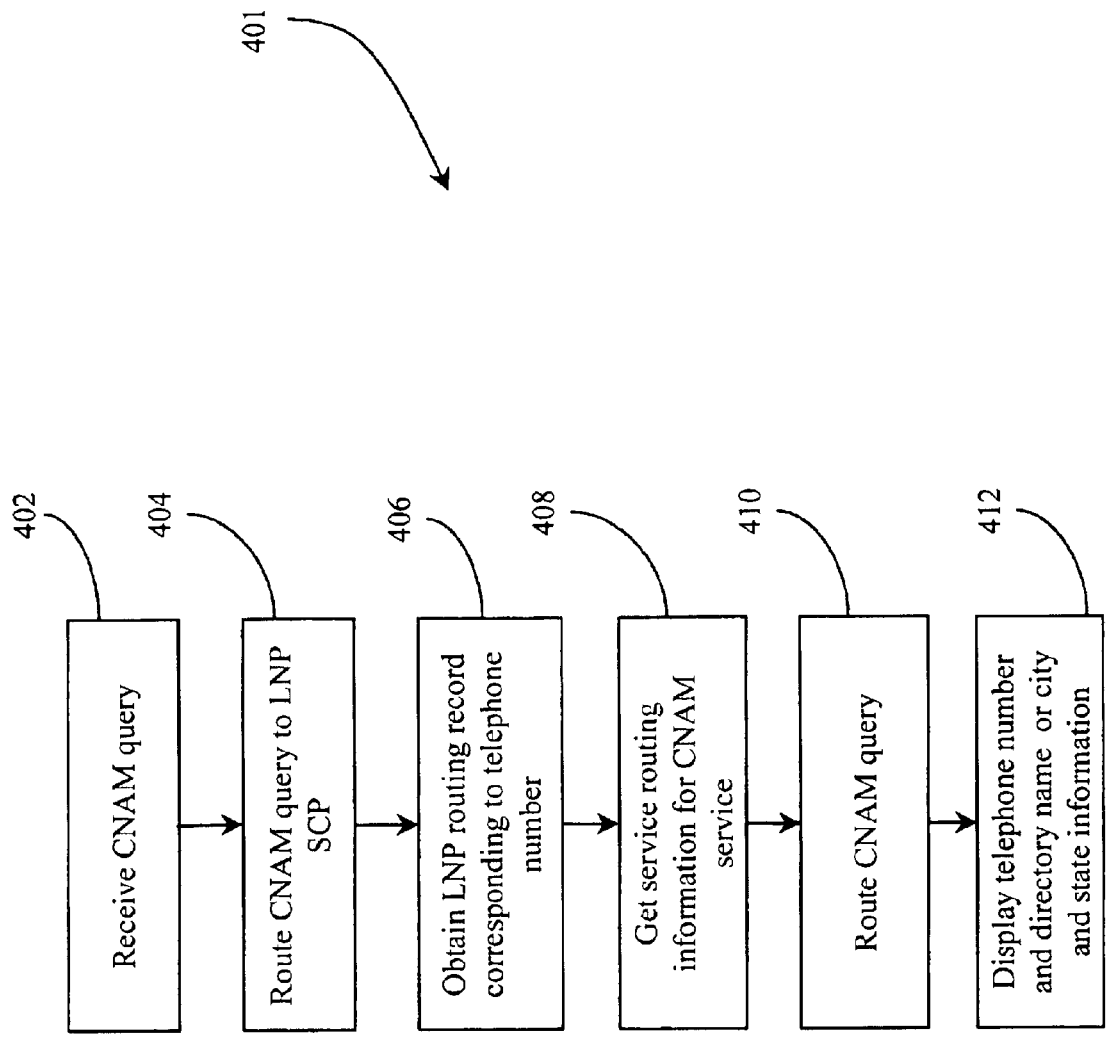
FIG. 4A is a flow chart of a conventional process for providing CNAM service with LNP.
Figure 4B:
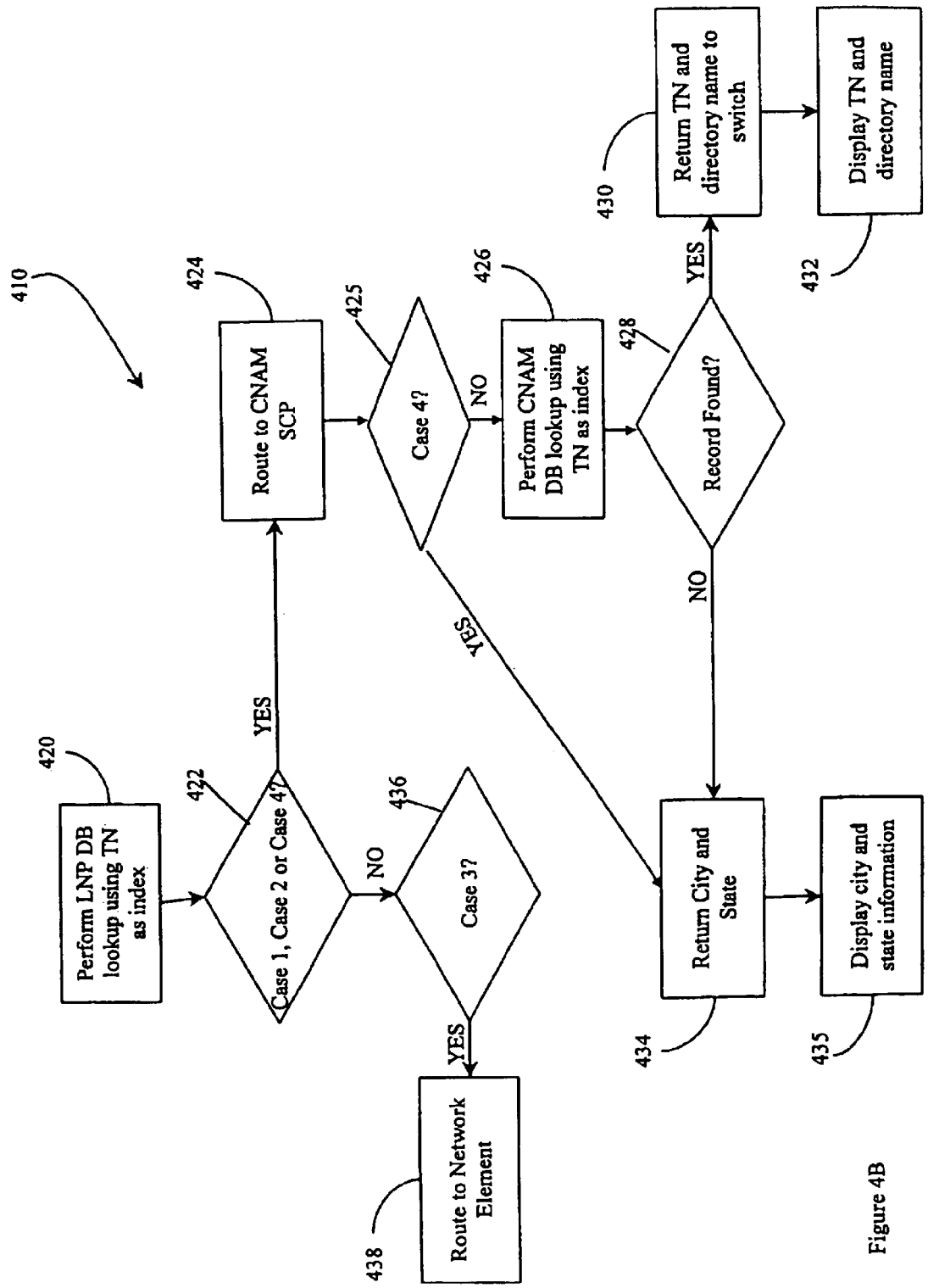
FIG. 4B is a flow chart for a conventional process for routing a CNAM query.
Figure 7:
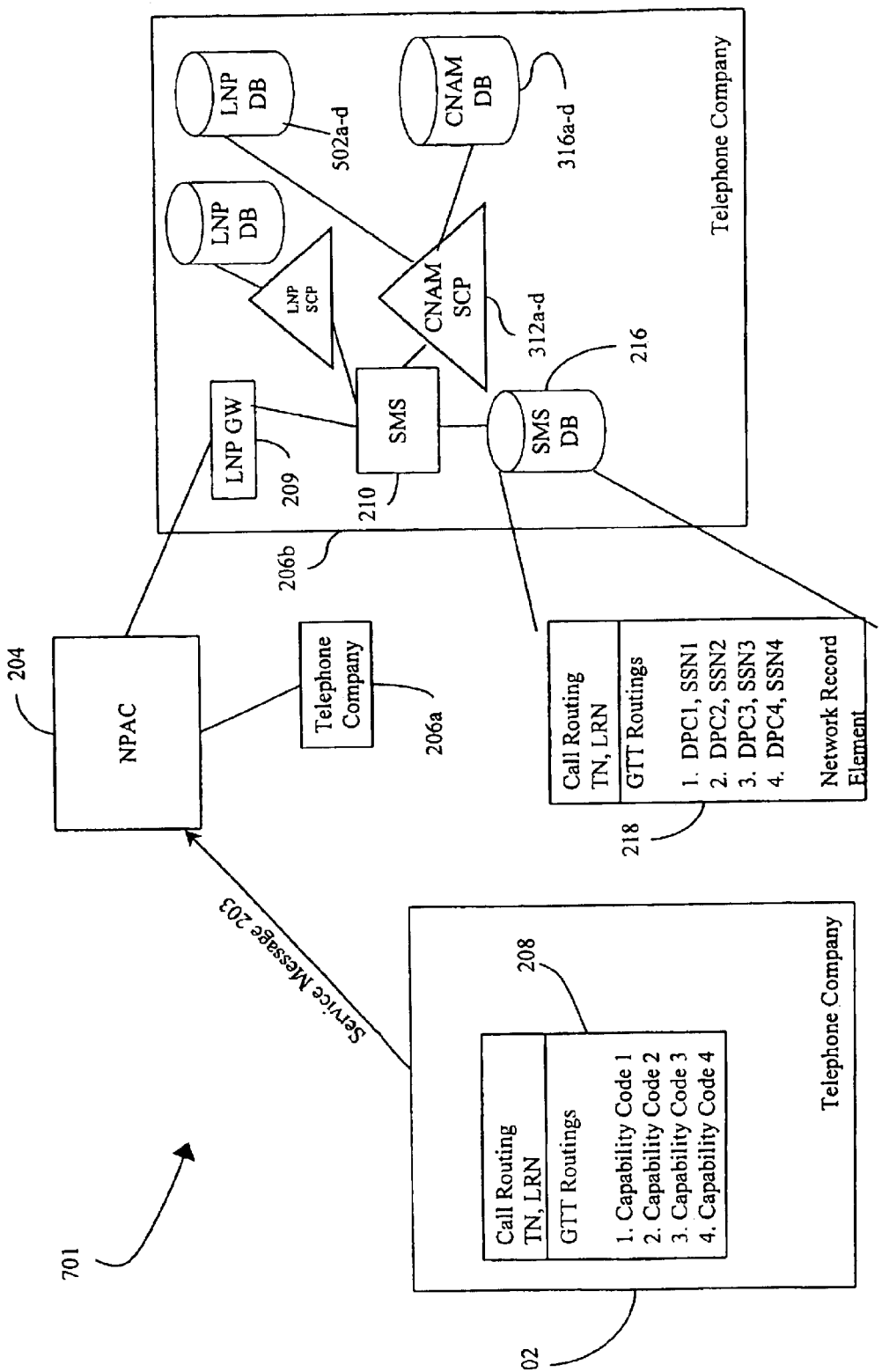
FIG. 7 is a schematic diagram of a system for updating and creating LNP databases for providing CNAM service according to a preferred embodiment of the present invention.

FIG. 7 is a schematic illustration for a system 701 according to a preferred embodiment of the present invention for updating CNAM LNP databases 502a–d. A network element record 218 is created as described above with reference to FIG. 2. This record is now deployed to both LNP SCP 320 and through CNAM SCPs 312a–d to CNAM LNP databases 502a–d. CNAM LNP databases 502a–d are initially created in essentially the same manner as LNP databases 322a–c. That is, there is an initial loading of LNP information into CNAM LNP databases 502a–d as would be know to those skilled in the art.

In the preferred embodiment of the present invention, network element record 218 is not physically stored in SMS database 216. Rather network element record 218 is derived from the information in telephone number record 208 and network addressing information that is stored in SMS database 216. That is, network element record 218 is a logical record, as opposed to a physical record stored in SMS database 216. Once created, each network element record 218 is stored in at least one of LNP databases 302a–c and in one of CNAM LNP databases 502a–d.

The determination of the routing or redirection of a CNAM query is preferably as follows. The software on CNAM SCPs 312a–d receives the CNAM query containing the calling telephone number (TN). CNAM SCPs 312a–d has received the CNAM query from the STP based on the first 6 digits of the queried TN. This TN is looked up in the LNP TN routing table to see if this number has been ported. If it is found (and therefore has been ported), the DPC and SSN of the CNAM SCP are extracted from the GTT portion of the record in the TN routing table. If it is not found, the DPC and SSN of the CNAM SCP are extracted from the Default GTT routing table. The DPC and SSN are placed in the CNAM query message and the message is flagged that it should now be routed by DPC/SSN rather than by routing on the first 6 digits of the queried TN. Now when the SCP sends the query to the STP, the STP will route the query to the correct CNAM SCP even if this SCP is owned by another company (as with telephone numbers corresponding to the third class of service). When the CNAM SCP has processed the query, it returns the query to switch 308, which originated the query. The identity of switch 308 is part of the message in the original query switch 308 sent out.

It should be noted that the present invention is applicable to any telephone service where the appropriate network element to respond to the service request must be determined in the LNP environment. Such services include, without limitation, caller ID name identification (as described above), CLASS, ISVM and LIDB. In the general case, for example, STP 314 receives a service request containing a request for the provision of a specified service. STP 314 transmits the service request to an SCP. The SCP receives the service request. SCP accesses a database using information contained in the service request, e.g., the calling party's telephone number, to obtain routing information for routing the service request to the network element responsible for providing the specified service. The SCP then routes the service request in accordance with the obtained routing information.

Thus, the foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for reducing traffic in a telephone network while providing caller name identification (CNAM) service, comprising:

a signaling transfer point (STP) to receive a CNAM query from a switch on which a called party is homed, wherein the CNAM query contains a calling party telephone number;

a CNAM SCP to receive the CNAM query from the STP and to return CNAM information to the switch;

a CNAM SCP coupled to the CNAM SCP; and a duplicate local number portability signal control point (LNP SCP) database accessible to the CNAM SCP, the CNAM SCP database containing a plurality of CNAM records, wherein each CNAM record, comprises:
a telephone number; and
a directory name corresponding to the telephone number, and wherein the duplicate LNP SCP database contains a plurality of global translation title (GTT) records, each GTT record, comprising:

a telephone number; and a service routing corresponding to a network element that provides the CNAM service.

2. The system recited in claim 1, wherein the STP causes every CNAM query to be routed to the CNAM SCP owned by a first telephone company for processing, and wherein the CNAM information includes the calling party telephone number and a directory name corresponding to the calling party telephone number.

3. The system recited in claim 1, wherein the CNAM SCP causes the CNAM query to be routed to another telephone company for processing, and wherein the CNAM information includes the calling party telephone number and a directory name corresponding to the calling party telephone number.

4. The system recited in claim 1, wherein the CNAM information includes city and state information.

5. A method for providing caller name identification (CNAM) service comprising the steps of:

receiving a CNAM query from a switch on which a called party is homed through an STP, wherein the CNAM query contains a calling party telephone number;

creating a duplicate LNP database containing a plurality of LNP routing records;

routing the query directly to a CNAM LNP SCP, which is coupled to the duplicate LNP database and a CNAM database;

accessing the LNP database obtaining routing information for processing the CNAM query; and routing the CNAM query in accordance with the obtained routing information for processing to obtain CNAM information in response to the CNAM query.

6. The method recited in claim 5, wherein the CNAM information comprises the calling party telephone number and a directory name corresponding to the calling party number.

7. The method recited in claim 5, wherein the CNAM information comprises city and state information on the caller ID display device.

8. The method recited in claim 5, further comprising the step of determining whether the CNAM query is to be processed by another telephone company, and if not, accessing a CNAM database using the calling party name as an index to obtain a directory name corresponding to the calling party telephone number.

9. A system for reducing network traffic in a telephone network providing caller name identification (CNAM) service comprising:

a signaling transfer point (STP) to receive a CNAM query from a switch on which a called party is homed, wherein the CNAM query contains a calling party telephone number;

a CNAM service control point (CNAM SCP) to receive the CNAM query from the STP and return CNAM information to the switch; and a CNAM LNP database accessible to the CNAM SCP that contains a plurality of LNP routing records that duplicate an existing LNP database, each LNP routing record, comprising:

a telephone number; and a service routing corresponding to a network element that provides the CNAM service.

10. The system recited in claim 9, further comprising:

a CNAM database coupled to the CNAM SCP that contains a plurality of CNAM records, each CNAM record, comprising:

a telephone number; and a directory name corresponding to the telephone number, wherein the CNAM information comprises the calling party telephone number and a directory name corresponding to the calling party telephone number.

11. The system recited in claim 9, wherein the CNAM SCP causes the CNAM query to be routed to another telephone company for processing, and wherein the CNAM information comprises the calling party telephone number and a directory name corresponding to the calling party telephone number.

12. The system recited in claim 9, wherein the CNAM information includes city and state information.

13. The system recited in claim 9, further comprising a CNAM caller ID display device on which the CNAM information is displayed.

14. A method for providing caller name identification (CNAM) service comprising the steps of:

receiving a CNAM query from a switch on which a called party is homed, wherein the CNAM query contains a calling party telephone number;

accessing a duplicate CNAM LNP database coupled to a CNAM SCP, containing a plurality of LNP routing records, obtaining routing information for processing the CNAM query; and routing the CNAM query in accordance with the obtained routing information.

15. The method recited in claim 14, further comprising the step of displaying the calling party telephone number and a directory name corresponding to the calling party number on a caller ID display device.

16. The method recited in claim 14, further comprising the step of displaying city and state information on a caller ID display device.

17. The method recited in claim 14, further comprising the step of determining whether the CNAM query is to be processed by another telephone company, and if not, accessing the CNAM database using the calling party name as an index to obtain a directory name corresponding to the calling party telephone number.

18. A system for providing a telephone service, comprising:

a signaling transfer point for receiving a service request requesting the telephone service to be provided from a switch on which a called party is homed;

a service SCP for receiving the service request from the signaling transfer point;

a duplicate LNP database coupled to the service SCP for providing routing information based on identification information in the service request; and means for routing the service request to a network element that provides the telephone service in accordance with the routing information.

19. The system recited in claim 18, wherein the SCP sends the query across a telephone network to another telephone company for processing.

20. The system recited in claim 18, wherein the telephone service is a calling name identification service, and wherein the service SCP is an CNAM SCP and the duplicate LNP database contains a plurality of global translation table records, further comprising a CNAM database containing at least one record having a telephone number and a directory name corresponding to the telephone number.

21. The system recited in claim 18, further comprising:

a first switch through which a calling party places a telephone call to a called party; and a second switch on which the called party's telephone number is homed that receives the telephone call and initiates the service request to the signaling transfer point for processing.

22. A method for providing CNAM service, comprising the steps of:

receiving a CNAM service request from a switch on which a called party is homed;

obtaining routing information to route the CNAM service request to a network element responsible for providing the CNAM service from a duplicate LNP database coupled to a CNAM SCP;

routing the CNAM service request to the network element to obtain CNAM information; and sending the CNAM information to a caller ID display device to be displayed.

23. The method recited in claim 22, further comprising the steps of:

obtaining an LNP routing record corresponding to a telephone number carried in the CNAM service request; and using the telephone number in the CNAM service request as an index into the duplicate LNP database to obtain the routing information.

24. The method recited in claim 22, wherein the CNAM information includes city and state information.

25. The method recited in claim 22, wherein the CNAM information includes calling party directory name and telephone number.

26. The method recited in claim 22, wherein said obtaining step, comprises the steps of:

determining a case of CNAM service to apply;

for CNAM service of a first or second case:

performing a database query of a CNAM database to obtain directory name information corresponding to a telephone number in the CNAM service request;

for CNAM service of a third case:

routing the CNAM service request to an appropriate network element for processing; and returning city and state information in response to the CNAM service request if the CNAM service is not of the first, second or third case.

* * * * *